3,717,588
AMORPHOUS ALUMINODISILICATE SUPPORTED CATALYST
Warner Alexander, Brookhaven, Kenneth F. Gosselin, Village Green, and James E. McEvoy, Springfield, Pa., assignors to Air Products and Chemicals, Inc., Philadelphia, Pa.
No Drawing. Filed Mar. 12, 1971, Ser. No. 123,844
Int. Cl. B01j 11/40
U.S. Cl. 252—455 R  1 Claim

ABSTRACT OF THE DISCLOSURE

A significant amount of transitional catalytically active metal component is ion-exchanged into a synthetic crystalline zeolitic alkali aluminodisulicate such as sodalite. The thus ion-exchanged zeolite, containing a measurable amount of residual alkali is hydrogen-treated at an elevated temperature such as 900° F., thereby reducing the metallic ion and decreasing zeolitic crystallinity. A catalyst comprising amorphous aluminodisilicate matrix as the support for the reduced transitional metal component is recovered after cooling. Such catalyst is effective as a hydrogenation catalyst and/or for other reactions requiring a supported metal catalyst.

BACKGROUND OF THE INVENTION

Field of invention

This invention relates to amorphous catalysts comprising silica, alumina, sodium, and a catalytic component such as nickel.

Prior art

Amorphous glasses are sometimes found in nature, and have generally been unsuitable for use as catalyst carriers. Synthetic dried gels have been widely used as high surface area catalyst carriers. Particular advantages have been achieved when catalytic materials have been distributed throughout a large-pored crystalline matrix such as a dehydrated zeolite. Catalyst activity has generally been associated with high surface supports, thus necessitating great care to minimize the possibility of any significant loss of surface area by the sintering or collapse of crystalline catalyst or an amorphous dried gel catalyst. There has been a long standing, unsatisfied demand for a catalyst having thermal stability, a low surface area, and high activity.

SUMMARY OF THE INVENTION

In accordance with the present invention, a crystalline ion-exchanged metalloaluminodisilicate comprising residual alkali zeolite is heated in a hydrogen atmosphere to provide an amorphous metalloaluminodisilicate containing residual alkali aluminodisilicate having an advantageous combination of activity, selectively, and stability for a catalytic reaction.

The invention is further clarified by reference to a plurality of examples.

EXAMPLE 1

An aqueous solution containing about 40% sodium hydroxide is heated to 105° C. and provided with power driven stirrers for suspending particles in the hot alkali. To 100 parts of the solution 5 parts of raw kaolin are added and stirred in the nearly boiling alkali for 30 minutes. By a series of tests it is established that the alkali treatment of the raw kaolin should be for a period of at least 10 but generally not more than about 60 minutes. The hot dispersion is filtered, and the hot alkaline solution is recycled for processing the next batch. The hot aqueous alkaline aging treatment of the raw kaolin brings about a recrystallization whereby sodalite is formed. The sodalite is recovered as a powder in the filter cake. This is washed and cooled. A dry sample is shown by X-ray diffraction to be high purity sodalite. A sample of the sodalite is dispersed in 0.1 molar nickel nitrate solution (about 2.9% by weight of nickel nitrate hexahydrate or 1.8% anhydrous nickel nitrate). The ion exchange treatment is repeated 3 times and the product is found to contain about 11% nickel and a significant amount of residual sodium. The 2:1 silica to alumina ratio of the original kaolin and the sodalite is undisturbed.

The particles of the nickel sodalite are heated in a hot hydrogen stream at a temperature increasing to about 900° F. during about one hour, and then heated in hydrogen at about 900° F. for about 120 minutes, thereby transforming most of the nickel from ionic to metallic form. A series of tests establishes that the calcination treatment should desirably be within a range from about 10 minutes to about 240 minutes and at a temperature within a range from about 850 to 1100° F. The zeolite apparently goes through a hydrogen zeolite stage as a result of the reduction of the metallo-zeolite. Substantially all hydrogen zeolitic aluminodisilicates, whether of the sodalite, harmotome, faujasite, or other structures, are thermally unstable at 900° F., notwithstanding the thermal stability of the corresponding sodium aluminodisilicates.

Such thermal treatment brings about a collapse of the sodalite structure, producing an amorphous nickel aluminodisilicate. The surface area of the amorphous nickel aluminodisilicate is relatively small. The catalyst was employed in a Parr hydrogenator in which a hydrocarbon was hydrogenated at room temperature and under a pressure of 60 lbs. per square inch gauge pressure. The rate of pressure drop evidenced rate of hydrogen consumption, from which it was feasible to calculate the reaction rate as moles of hydrogen consumed per minute per g. of catalytic metal per mole of olefin. Using an amount of catalyst providing 0.18 g. of nickel for 0.5 mole of hydrocarbon observations were made of the reaction rates as moles of hydrogen consumed per 1000 minutes.

| | Reaction rate, moles $H_2$/1000 min. |
|---|---|
| Pentene-1 | 14.7 |
| 2-methyl butene-1 | 14.3 |
| Hexene-1 | 27.8 |
| Cyclohexene | 37 |
| 2-3 dimethyl butene-1 | 26.1 |
| Octene-1 | 61.5 |

Such differences in reaction rate for different structures of olefins is to be expected. The reaction rate average for the six examples of olefins was 30.2 moles $H_2$/1000 min., thus contrasting with the average rate of 2.8 moles $H_2$/1000 min., for the same concentration of metal as Raney nickel.

EXAMPLE 2

Sodium phillipsite derived from meta kaolin and aqueous hydroxide is partially exchanged with a solution of nickel ammonium acetate. The ion-exchanged zeolite is dried in a stream of $H_2$ at 900° F. for 60 minutes and cooled to provide nickel aluminodisilicate. Hydrogen phillipsite crystal structure collapses at a moderately low temperature. The aluminodisilicate containing both crystalline and amorphous sodium aluminodisilicate (by rea- of the incompleteness of the ion-exchange) and metallic nickel provides a more rapid reaction rate for the hydrogenation of olefins than the same weight of nickel as Raney nickel.

EXAMPLE 3

Potassium harmotome derived from meta kaolin and aqueous potassium hydroxide is ion-exchanged with ammoniacal ammonium carbonate to provide an ammonium harmotome containing measurable amounts of residual potassium. Particles of ammonium harmotome are heated in the vapor of ammonium hydroxide to provide a hydrogen harmotome, which is partially ion-exchanged with an aqueous solution of nickel formate. After drying in a stream of $H_2$ at about 300° F., the nickel potassium harmotome is heated in $H_2$ at 900° F. for about 90 minutes to collapse the crystalline structure and to provide an amorphous matrix of potassium aluminodisilicate and aluminodisilicate containing metallic nickel. Such product is shaped into pellets, and shown to be more active, on a nickel content basis, than pellets of Raney nickel for the hydrogenation of olefins.

EXAMPLE 4

Sodalite, prepared from raw kaolin is ion-exchanged to provide a crystalline product corresponding essentially to:

$$(NiO)_{0.4}(Na_2O)_{0.6} \cdot Al_2O_3 \cdot 2SiO_2$$

and having a composition corresponding to about:

| | Percent |
|---|---|
| NiO | 10.0 |
| $Na_2O$ | 12.9 |
| $Al_2O_3$ | 35.4 |
| $SiO_2$ | 47.1 |

Such nickel sodium sodalite is subjected to drying in a stream of $H_2$ at 250° F. for about 2 hours and is then heated in $H_2$ at about 1100° F. for 10 minutes to provide an amorphous nickel aluminodisilicate containing sodium aluminodisilicate. The cooled catalyst is compressed into pellets and employed for the hydrolysis of methane with indications of a combination of activity, selectivity, and stability of possible commercial interest.

EXAMPLE 5

The catalyst of Example 4 is employed for the hydrogenation of vegetable oils such as cottonseed oil, and is more active than supported nickel catalysts marketed for this reaction.

EXAMPLE 6

Following the general pattern of Example 4, but substituting a technical grade of a cerium salt (i.e., a mixture of rear earth salts in which a cerium salt is the most abundant component) for the nickel salt, an amorphous catalyst containing about 13% $Na_2O$ and about 10% $Ce_2O_3$ is prepared. Such catalyst has activity as a cracking catalyst, isomerization catalyst, and alkyl aromatic redistribution catalyst.

EXAMPLE 7

By a series of tests it is established that a transitional metal (At. Nos. 21–32, 39–51, 84 and 89–103) having catalytic effectiveness is advantageously supported in a matrix of the type disclosed in Example 4, comprising a mixture of amorphous aluminodisilicate and amorphous sodium aluminodisilicate. Although the matrix has relatively low surface area, the content of the catalytic metal component (oxide, chloride, sulfide or metallic state) has high activity for catalytic reactions of the type generally promoted by such transitional metal components.

EXAMPLES 8, 9 AND 10

Olive oil was hydrogenated by a standard hydrogenation test described in U.S. Pat. 3,123,627 (col. 4, l. 29–col. 5, l. 13) using several catalysts. The nickel on powder-containing silica gel of large pore size of 3,123,627 permits hydrogenation at a rate of 2.68 $I_2$ number per minute (col. 7, l. 4–7) thus being better than a Raney nickel catalyst having a rate of 0.20 $I_2$ number per minute. The nickel on amorphous sodium aluminodisilicate derived from sodalite had advantageous properties. Three different catalysts were prepared, and the performance characteristics in the olive oil hydrogenation test were noted as follows:

| | Percent Ni on catalyst | Grams of— Catalyst | Ni | $I_2$/min. |
|---|---|---|---|---|
| Example: | | | | |
| 8 | 5.0 | 2.2 | 0.11 | 2.36 |
| 9 | 6.9 | 1.6 | 0.11 | 2.70 |
| 10 | 8.9 | 1.23 | 0.11 | 2.21 |
| Raney Ni, control | 50 | 0.4 | 0.2 | 0.20 |

The catalyst of Example 10 was prepared using a weight ratio of 1.5 parts of sodium hydroxide per part of meta kaolin, and conducting the reaction for 2 hours to provide a sodalite containing, on the dried basis, 24.4% $Na_2O$. After exchange with three stages of nickel nitrate solution, the NiO content of the product corresponded to 8.9% Ni as metallic nickel. Such nickel-exchange lowered the $Na_2O$ content from 24.4 to 14%.

Similarly, the catalysts of Examples 8 and 9 were prepared by reacting meta kaolin with sodium hydroxide to prepare sodalite, ion-exchangeing to provide a nickel sodalite, and heating at conditions collapsing the crystallinity of the sodalite and reducing the ionic nickel to metallic nickel. The nickel exchanged sodalite was placed in an electric furnace. Hydrogen flowed through the furnace as it was heated to 900° F. during about 20 minutes. The 900° F. temperature was maintained for about 90 minutes, and then cooled to ambient temperature. The sodalite precursor for the catalyst of Example 8 was subjected to ion exchange with ammonium nitrate to reduce the $Na_2O$ content from 25.2% to 19%, followed by a single stage of nickel nitrate exchange to provide said 5.0% nickel content.

The effectiveness of the hydrogenation catalyst was further confirmed by hydrogenation of hexene and measuring the induction period, the time required for 80% hydrogenation, and the constant "k" for the reaction rate as expressed, as moles of hydrogen consumed per 1000 minutes. Such performance data were as follows:

| | "k" as moles $H_2$/1,000 min. | Minutes for 80% hydrogenation |
|---|---|---|
| Example: | | |
| 8 | 40.6 | 20 |
| 10 | 52 | 9.5 |

The versatility of the catalyst and its superiority over Raney nickel for hydrogenation reactions suggests advantageous utility for the catalyst.

EXAMPLE 11

In preparations of small batches of sodalite, it was customary to quench the reaction by dumping the hot nutrient in a large volume of cold water. Pilot plant operation led to a procedure for filtering the hot nutrient and washing the filter cake with cold water. The catalyst derived from the washed filter cake, after several ion-exchange steps with a 2.5% solution of nickel nitrate (pH about 4.0), was effective enough in the hydrogenation of olive oil to provide a change of 3.75 $I_2$ number per minute. Poorer results were obtained in attempts to conduct the ion-exchange step with significantly more concentrated (e.g., 10%) solutions of nickel nitrate. The lower pH of the more concentrated solutions apparently destroys some of the sodalite structure, and thus impairs the activity of the catalyst.

The crystalline zeolite may be prepared from calcined perlite, bentonite, deexothermed kaolin, or aluminosilicates and/or from combination of sodium silicate and sodium aluminate with or without siliceous minerals. Some of the transitional metal anion may be introduced by intercalation during zeolite formation such as by intercalation of chromate in cancrinite cage structure. Transitional metals as cations may be introduced, as by base exchange, into such intercalated materials.

Some of the sodium content of the freshly prepared zeolite can be removed by ion exchange with ammonium nitrate prior to the step of ion exchange to introduce the catalytically active transitional metal ion.

Various modifications of the invention are possible without departing from the scope of the appended claim.

The invention claimed is:

1. In a method of preparing a catalyst comprising a transitional metal component in a predominantly aluminosilicate matrix having a relatively low surface area, the improvement which consists of:

preparing a synthetic crystalline alkali aluminodisilicate zeolite;

replacing a portion of the alkali in the alkali zeolite by at least one other cation by ion exchange to provide an ion-exchanged zeolite containing a measurable amount of residual alkali zeolite, said at least one other cation comprising at least a major portion of ion-exchanged zeolitic cation and present in the form of the salt of a transitional metal in said crystalline alkali aluminodisilicate zeolite;

subjecting the ion-exchanged crystalline zeolite containing transitional metal salt to a thermal treatment in the presence of $H_2$ at a temperature of at least 900° F. for at least 10 minutes, whereby the zeolite crystallinity is substantially completely destroyed and whereby the transitional metal component is reduced by the hot hydrogen; and cooling the resulting catalyst comprising collapsed aluminodisilicate matrix having no significant amount of crystalline zeolite, and reduced transitional metal component.

References Cited

UNITED STATES PATENTS 3,114,695    12/1963    Rabo et al. _____ 252—455 Z

CARL F. DEES, Primary Examiner